United States Patent
Yamagata et al.

[11] Patent Number: 6,141,144
[45] Date of Patent: Oct. 31, 2000

[54] OPTICAL AXIS CORRECTING SYSTEM

[75] Inventors: Masakazu Yamagata; Shunichiro Wakamiya, both of Saitama; Tatsuo Gotoh, Tokyo; Homu Takayama; Yoichi Kojima, both of Saitama, all of Japan

[73] Assignee: Asahi Seimitsu Kabushiki Kaisha, Tokyo, Japan

[21] Appl. No.: 09/366,765

[22] Filed: Aug. 4, 1999

[30] Foreign Application Priority Data

Aug. 11, 1998 [JP] Japan ................................. 10-226856

[51] Int. Cl.[7] ............................ G02B 17/00; G02B 13/14
[52] U.S. Cl. ........................... 359/365; 359/353; 359/357
[58] Field of Search .................................. 359/350–356, 359/364–366, 205, 744, 725–732, 856–861, 399

[56] References Cited

U.S. PATENT DOCUMENTS

| | | | |
|---|---|---|---|
| 4,621,888 | 11/1986 | Crossland et al. | 359/357 |
| 4,621,890 | 11/1986 | Suzuki et al. | 359/744 |
| 5,055,663 | 10/1991 | Morimoto et al. | 250/201.4 |
| 5,136,421 | 8/1992 | Sagan | 359/353 |
| 5,214,532 | 5/1993 | Hall et al. | 359/357 |
| 5,936,771 | 8/1999 | Cooper | 359/365 |

*Primary Examiner*—Thong Nguyen
*Attorney, Agent, or Firm*—Greenblum & Bernstein, P.L.C.

[57] ABSTRACT

An optical axis correcting system includes a first afocal optical system, an optical deflector which corrects the deviation of an optical axis of light incident upon the first optical system, a second afocal optical system, and a light convergent optical system. The optical axis correcting system satisfies (1) $3.60 < |fp(I)/fN(I)| < 5.30$, (2) $1.00 < |fp(II)/fN(II)| < 2.41$, and (3) $0.12 < r1(II)/f < 0.23$, wherein $fp(I)$ represents the focal length of a positive lens group of the first optical system, $fN(I)$ represents the focal length of a single negative lens element of the first optical system, $fp(II)$ represents the focal length of a positive lens group of the second optical system, $fN(II)$ represents the focal length of a negative lens group of the second optical system, $r1(II)$ represents the radius of curvature of the surface oif a positive lens element of the second afocal optical system closest to the optical deflector, and f represents the focal length of the whole optical system.

7 Claims, 5 Drawing Sheets

OPTICAL AXIS CORRECTING SYSTEM

BACKGROUND OF THE INVENTION

1. Field of the Invention

The present invention relates to an optical system for correcting an optical axis, including an optical deflector.

2. Description of the Related Art

Figure 1:
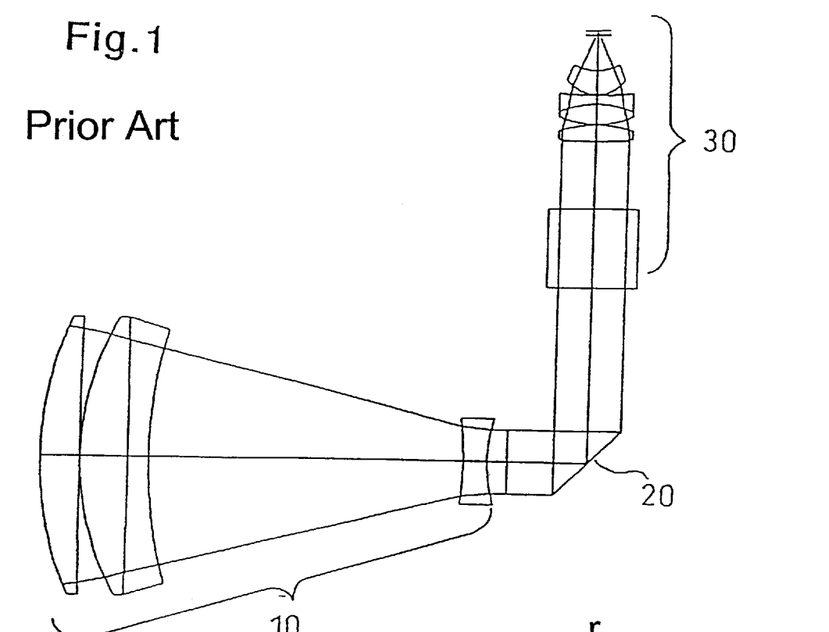
FIG. 1 is a schematic view of a known optical axis correcting system.

FIG. 1 shows a known optical axis correcting system including an optical deflector to which the present invention is directed. This optical system is comprised of a first optical system (afocal optical system) 10, a deflector 20 and an optical convergent optical system 30, in this order from the object side. The deflector 20 deflects a light incident thereupon so that the light incident upon the first optical system 10 can be always converged onto a same point by the convergent optical system 30, even if the optical axis of the light incident on the first optical system 10 is inclined.

However, in the known optical axis correcting system, if the convergent optical system 30 requires strict optical properties (aberration correction), it is difficult to increase the magnification of the first optical system 10 and the deflection angle of the light by the deflector 20, and hence it is difficult to miniaturized the convergent optical system 30. In other words, if the magnification of the first optical system 10 or the deflection angle of the deflector 20 is increased, light is made incident upon the periphery of the convergent optical system 30, thus resulting in a reduced convergence.

SUMMARY OF THE INVENTION

It is an object of the present invention to provide an optical axis correcting system in which the convergent optical system behind the deflector can be miniaturized or the deflection angle of the deflector an be increased without deteriorating the convergence performance.

According to an aspect of the present invention, there is provided an optical axis correcting system including: a first optical system having a positive lens group and a single negative lens element, arranged in this order from the object side; an optical deflector for correcting the deviation of an optical axis of light incident upon the first optical system; a second optical system having at least a positive lens group and a negative lens group, arranged in this order from the object side; and a convergent optical system, the first optical system, the optical deflector, the second optical system, and the convergent optical system being arranged in this order from the object side. The optical axis correcting system satisfies the following conditions: (1) 3.60<|fp(I)/fN(I)|<5.30, (2) 1.00<|fp(II)/fN(II)|<2.41, and (3) 0.12<r1 (II)/f<0.23; wherein fp(I) represents the focal length of the positive lens group of the first optical system; fN(I) the focal length of the single negative lens element of the first optical system; fp(II) the focal length of the positive lens group of the second optical system; fN(II) the focal length of the negative lens group of the second optical system; r1 (II) the radius of curvature of the surface of the positive lens group of the second optical system that is located closest to the optical deflector; and f the focal length of the whole optical system.

Preferably, the positive and negative lens groups of the second optical system are each made of a single lens element.

Preferably, the positive lens group of the first optical system includes a positive lens element, a positive lens element and a negative lens element, arranged in that order from the object side.

According to another aspect of the present invention, there is provided an optical axis correcting system including: a first afocal optical system; an optical deflector for correcting deviation of an optical axis of light incident upon the first afocal optical system; and a convergent optical system, arranged in that order from the object side. The optical axis correcting system further includes a second afocal optical system provided between the optical deflector and the convergent optical system, the second afocal optical system being composed of at least a positive lens group and a negative lens group, in this order from the object side. The optical axis correcting system satisfies the following conditions: (1) 3.60<|fp(I)/fN(I)|<5.30, (2) 1.00<|fp(II)/fN(II)|<2.41, and (3) 0.12<r1 (II)/f<0.23; wherein fp(I) represents the focal length of the positive lens group of the first afocal optical system; fN(I) the focal length of the single negative lens of the first afocal optical system; fp(II) the focal length of the positive lens group of the second afocal optical system; fN(II) the focal length of the negative lens group of the second afocal optical system; r1 (II) the radius of curvature of the surface of the positive lens group of the second afocal optical system that is located closest to the optical deflector; and f the focal length of the whole optical system.

Preferably, the positive and negative lens groups of the second afocal optical system are each made of a single lens element.

Preferably, the first afocal optical system includes a positive lens group and a single negative lens element, arranged in this order from the object side.

Preferably, the positive lens group of the first afocal optical system is made of a positive lens element, a positive lens element and a negative lens element, arranged in this order from the object side.

BRIEF DESCRIPTION OF THE DRAWINGS

The invention will be discussed below in detail with reference to the accompanying drawings, in which.

DESCRIPTION OF THE PREFERRED EMBODIMENT

Figure 2:
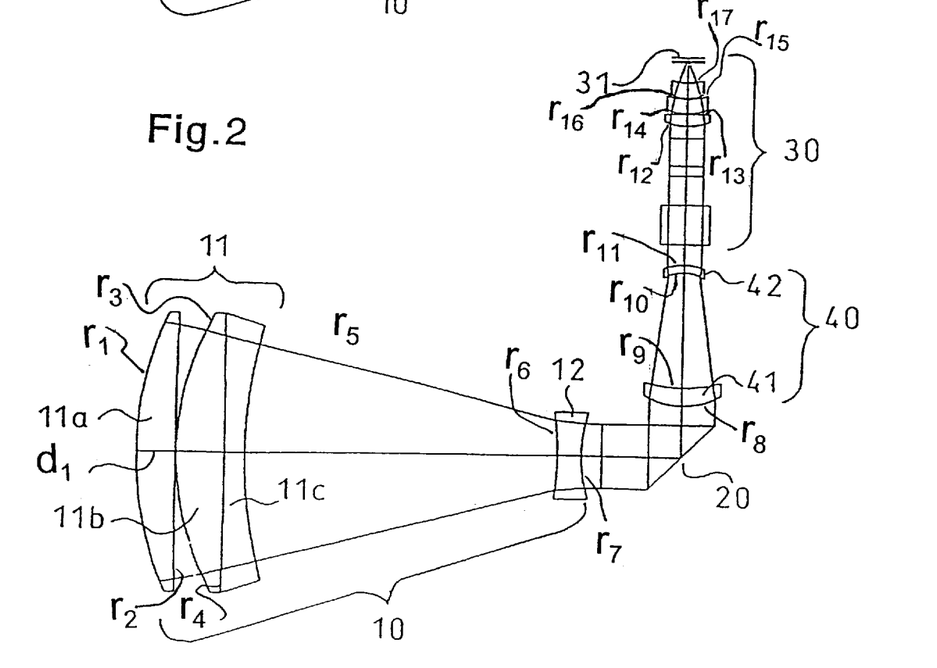
FIG. 2 is a schematic view of an optical axis correcting system according to a first embodiment of the present invention.

FIG. 2 shows a first embodiment of an optical axis correcting system according to the present invention. The optical system is composed of a first optical system (telephoto optical system or afocal optical system) 10, an optical deflector 20, a second optical system (afocal optical system) 40, and an optical convergent optical system 30, arranged in that order from the object side. The optical system of the present invention is characterized by the second (afocal) optical system 40 provided between the optical deflector 20 and the optical corvergent optical system 30, compared with the prior art shown in FIG. 1. The deflector 20 is adapted to make light incident upon the convergent optical system 30 correctly and is composed of, for example, a deflector mirror which is moved in two orthogonal directions. The deflector mirror is provided on its rotating portion with an electromagnet drive unit composed of a pair of coils and magnets. The electromagnet drive unit is driven in response to, for example, an output of a detector which detects the position of light incident upon the convergent optical system 30.

The first optical system 10 is composed of a first positive lens group 11 and a negative lens group 12, arranged in that order from the object side. The positive lens group 11 is composed of a positive lens element 11a, a positive lens element 11b and a negative lens element 11c, arranged in that order from the object side. The second optical system 40 is comprised of a single positive lens element 41 and a single negative lens element 42, arranged in that order from the object side. The optical systems 10 and 40 are each provided with a pair of object points and image points at an infinite distance to form an afocal optical system in which if incident light is substantially parallel, emission light is also substantially parallel. The first afocal optical system 10 reduces the beam diameter toward the deflector 20 from the object side, and the second afocal optical system 40 reduces the beam diameter toward the convergent optical system 30 from the deflector 20. The convergent optical system 30 has a positive power and converges the light emitted from the second afocal optical system 40 onto a light receiving element 31.

The light between the first optical system 10 and the second optical system 40 is substantially parallel light which is made incident upon the deflector mirror 20 as an optical deflector. Since the deflector mirror 20 is arranged in the light path of parallel light between the first and second optical systems 10 and 40, no "out-of-focus" takes place in the convergent optical system 30 even if the light is deflected by the deflector 20.

The optical axis correction system constructed as above, according to the present embodiment, satisfies the requirements specified in conditions (1) through (3).

Condition (1) specifies the requirement on the magnification of the first optical system 10 so as not to deteriorate the optical performance thereof when the deviation of the optical axis of the incident light upon the first optical system 10 is corrected by the deflector 20. If the magnification of the first optical system is below the lower limit in condition (1), the deflection angle of the optical axis by the deflector can be decreased but the first optical system becomes large, contrary to the miniaturization thereof. Conversely, if the magnification of the first optical system is above the upper limit in condition (1), the first optical system can be made small, but the deviation of the optical axis to be corrected by the deflector is too large to obtain a desired optical performance.

Condition (2) specifies the requirement on the magnification of the second optical system 40 so as not to deteriorate the optical performance thereof when the deviation of the optical axis of the incident light upon the first optical system is corrected by the deflector and to make the convergent optical system small. If the magnification of the second optical system is below the lower limit in condition (2), miniaturization of the convergent optical system cannot be achieved. Conversely, if the magnification of the second optical system is above the upper limit in condition (2), the convergent optical system can be made small, however, a desired optical performance cannot be obtained if the deviation of the optical axis of the first optical system is corrected by the deflector.

Condition (3) specifies the requirement regarding the radius of curvature of the surface of the positive lens group of the second optical system 40 that is located closest to the deflector 20 in order to correct spherical aberration. If the positive lens group is made of a single positive lens element as shown in FIG. 2, condition (3) refers to the radius of curvature of the surface of the single lens element that is located adjacent the deflector. If the radius of curvature is below the lower limit in condition (3), an over-correction of spherical aberration occurs. If the radius of curvature is above the upper limit in condition (3), spherical aberration cannot be sufficiently corrected. Namely, if the requirements specified in condition (3) are not satisfied, a desired optical performance cannot be obtained.

Numerical examples (embodiments) of the present invention will be given below. In the following tables and the drawings, "f" designates the focal length, "fB" the back focal distance, "NA" the numerical aperture, "R" the radius of curvature, "D" the lens thickness or the distance between the lenses, and "N" the refractive index at the wavelength of 785 nm. In the aberration diagrams, 765, 785 and 805 represent spherical aberrations at the respective wavelengths (nm).

Embodiment 1

Figures 3, 4, 6, 7:
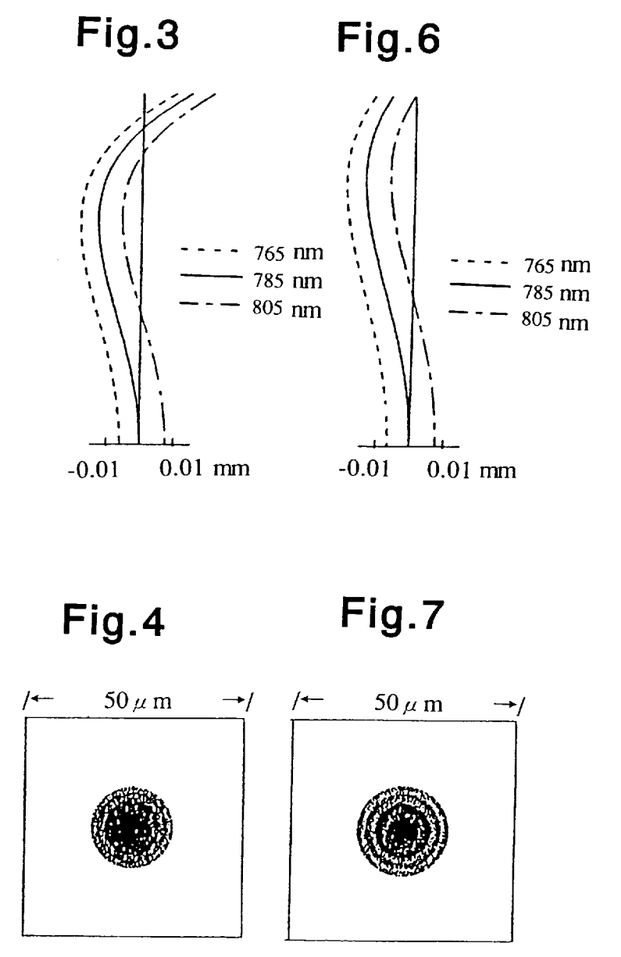
FIG. 3 shows a spherical aberration diagram before a deflector mirror is deflected in a first embodiment of an optical axis correcting system according to the present invention.
FIG. 4 shows a spot diagram of light incident at an infinite distance (incident angle 0°) before a deflector mirror is deflected in a first embodiment of an optical axis correcting system according to the present invention.
FIG. 6 shows a spherical aberration diagram before a deflector mirror is deflected in a second embodiment of an optical axis correcting system according to the present invention.
FIG. 7 shows a spot diagram of light incident at an infinite distance (incident angle 0°) before a deflector mirror is deflected in a second embodiment of an optical axis correcting system according to the present invention.
Figure 5:
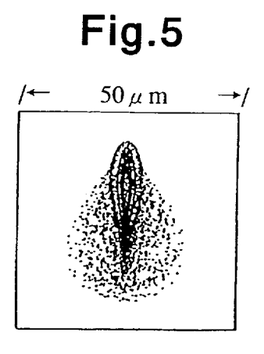
FIG. 5 shows a spot diagram of light incident at an infinite distance and incident angle 1° when the optical axis is corrected by deflecting a deflector mirror in a first embodiment of an optical axis correcting system according to the present invention.

Table 1 shows numerical data of a first embodiment of the invention. The structure of the optical system is same as that shown in FIG. 2. FIG. 3 is a spherical aberration diagram of the optical system of the first embodiment at a wavelenght of 765 nm, 785 nm, and 805 nm, before the optical deflector (deflector mirror) is utilized (i.e., before correction). FIG. 4 shows a spot diagram of incident light at an infinite distance (incident angle 0°) in an optical system of the first embodiment, before the deflector is utilized. FIG. 5 shows a spot diagram of incident light at an infinite distance and incident angle 1° in an optical system the first embodiment when the incident light is corrected by the deflector. It can be found from the spot diagrams that the diameters of all beam spots are within a 50 µm×50 µm square. In other words, little beam spot deterioration occurs after correction.

TABLE 1

$f=100$
$f_B=6.345$
$NA=0.331$

| Surface No. | R | D | N |
|---|---|---|---|
| 1 | 86.929 | 9.603 | 1.51062 |
| 2 | 1397.787 | 0.253 | — |
| 3 | 71.969 | 12.130 | 1.51062 |
| 4 | −1728.477 | 5.054 | 1.72394 |
| 5 | 116.795 | 78.641 | — |
| 6 | −72.576 | 6.156 | 1.70583 |
| 7 | 39.007 | 38.411 | — |
| 8 | 18.528 | 4.650 | 1.51062 |
| 9 | 35.227 | 29.516 | — |
| 10 | −9.198 | 2.022 | 1.82462 |
| 11 | −14.151 | 35.681 | — |
| 12 | 14.327 | 3.032 | 1.51062 |
| 13 | ∞ | 0.202 | — |
| 14 | 14.940 | 3.538 | 1.51062 |
| 15 | 16.432 | 0.202 | — |
| 16 | 7.783 | 4.043 | 1.51062 |
| 17 | 16.507 | — | — |

Embodiment 2

Figure 8:
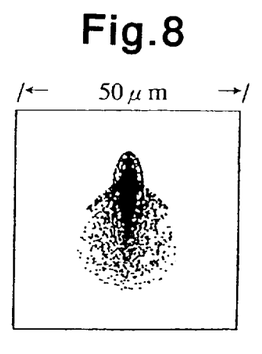
FIG. 8 shows a spot diagram of light incident at an infinite distance and incident angle 1° when the optical axis is corrected by deflecting a deflector mirror in a second embodiment of an optical axis correcting system according to the present invention.

Table 2 shows numerical data of a second embodiment of the invention. The structure of the optical system is same as that shown in FIG. 2. FIG. 6 is a spherical aberration diagram of the optical system of the second embodiment at a wavelength of 765 nm, 785 nm, and 805 nm, before the optical deflector (deflector mirror) is utilized (i.e., before correction). FIG. 7 shows a spot diagram of incident light at an infinite distance (incident angle 0°) in an optical system of the second embodiment, before the deflector is utilized. FIG. 8 shows a spot diagram of incident light at an infinite distance and incident angle 1° in an optical system of the second embodiment, when the incident light is corrected by the deflector. It can be found from the spot diagram that the diameters of all beam spots are within a 50 µm×50 µm square. In other words, little beam spot deterioration occurs after correction.

TABLE 2

$f=100$
$f_B=4.469$
$NA=0.36$

| Surface No. | R | D | N |
|---|---|---|---|
| 1 | 97.110 | 10.727 | 1.51062 |
| 2 | 1561.496 | 0.282 | — |
| 3 | 80.398 | 13.550 | 1.51062 |
| 4 | −1930.917 | 5.646 | 1.72394 |
| 5 | 130.474 | 87.851 | — |
| 6 | −81.078 | 6.877 | 1.70583 |
| 7 | 43.575 | 42.909 | — |
| 8 | 20.601 | 5.533 | 1.51062 |
| 9 | 46.861 | 32.747 | — |
| 10 | −9.297 | 2.258 | 1.68419 |
| 11 | −18.356 | 39.860 | — |
| 12 | 18.295 | 3.388 | 1.51062 |
| 13 | −111.225 | 0.226 | — |
| 14 | 9.125 | 3.388 | 1.51062 |
| 15 | 19.827 | 0.226 | — |
| 16 | 4.920 | 3.388 | 1.51062 |
| 17 | 4.201 | — | — |

Embodiment 3

Figures 9, 12:
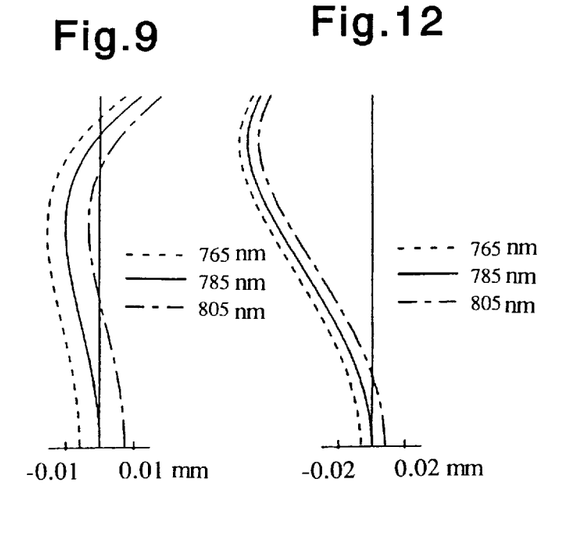
FIG. 9 shows a spherical aberration diagram before a deflector mirror is deflected in a third embodiment of an optical axis correcting system according to the present invention.
FIG. 12 shows a spherical aberration diagram before a deflector mirror is deflected in a fourth embodiment of an optical axis correcting system according to the present invention.
Figure 10:
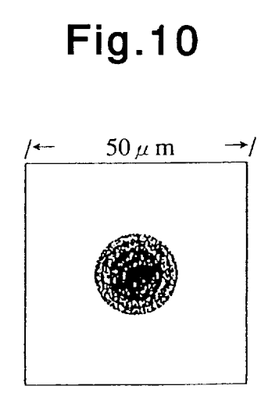
FIG. 10 shows a spot diagram of light incident at an infinite distance (incident angle 0°) before a deflector mirror is deflected in a third embodiment of an optical axis correcting system according to the present invention.
Figure 11:
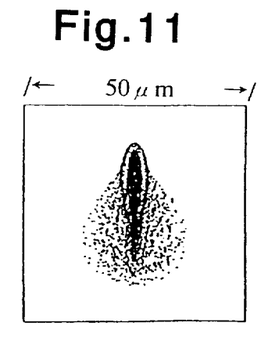
FIG. 11 shows a spot diagram of light incident at an infinite distance and incident angle 1° when the optical axis is corrected by deflecting a deflector mirror in a third embodiment of an optical axis correcting system according to the present invention.

Table 3 shows numerical data of a third embodiment of the invention. The structure of the optical system is same as that shown in FIG. 2. FIG. 9 is a spherical aberration diagram of the optical system of the third embodiment at a wavelength of 765 nm, 785 nm, and 805 nm, before the optical deflector (deflector mirror) is utilized (i.e., before correction). FIG. 10 shows a spot diagram of incident light at an infinite distance (incident angle 0°) in an optical system of the third embodiment, before the deflector is utilized. FIG. 11 shows a spot diagram of incident light at an infinite distance and incident angle 1° in an optical system of the third embodiment, when the incident light is corrected by the deflector. It can be found from the spot diagrams that the diameters of all beam spots are within a 50 μm×50 μm square. In other words, little beam spot deterioration occurs after correction.

TABLE 3

$f=100$
$f_B=5.322$
$NA=0.356$

| Surface No. | R | D | N |
|---|---|---|---|
| 1 | 93.469 | 10.325 | 1.51062 |
| 2 | 1502.945 | 0.272 | — |
| 3 | 77.384 | 13.042 | 1.51062 |
| 4 | −1858.514 | 5.434 | 1.72394 |
| 5 | 125.581 | 84.557 | — |
| 6 | −78.036 | 6.619 | 1.70583 |
| 7 | 41.942 | 41.300 | — |
| 8 | 19.922 | 5.000 | 1.51062 |
| 9 | 37.877 | 31.736 | — |
| 10 | −9.890 | 2.174 | 1.82462 |
| 11 | −15.216 | 38.366 | — |
| 12 | 13.683 | 3.261 | 1.51062 |
| 13 | ∞ | 0.217 | — |
| 14 | 12.010 | 3.652 | 1.51062 |
| 15 | 14.401 | 0.217 | — |
| 16 | 6.655 | 4.174 | 1.51062 |
| 17 | 7.736 | — | — |

Embodiment 4

Figure 13:
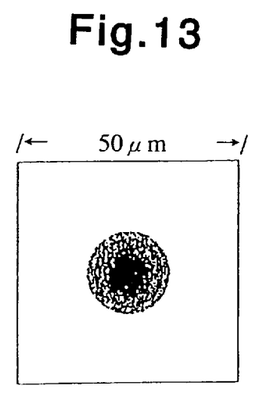
FIG. 13 shows a spot diagram of light incident at an infinite distance (incident angle 0° before a deflector mirror is deflected in a fourth embodiment of an optical axis correcting system according to the present invention.
Figure 14:
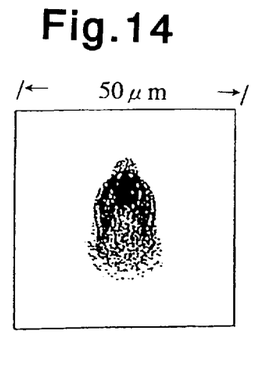
FIG. 14 shows a spot diagram of light incident at an infinite distance and incident angle 1° when the optical axis is corrected by deflecting a deflector mirror in a fourth embodiment of an optical axis correcting system according to the present invention.

Table 4 shows numerical data of a fourth embodiment of the invention. The structure of the optical system is same as that shown in FIG. 2. FIG. 12 is a spherical aberration diagram of the optical system of the fourth embodiment at a wavelength of 765 nm, 785 nm, and 805 nm, before the optical deflector (deflector mirror) is utilized (i.e., before correction). FIG. 13 shows a spot diagram of incident light at an infinite distance (incident angle 0°) in an optical system of the fourth embodiment, before the deflector is utilized. FIG. 14 shows a spot diagram of incident light at an infinite distance and incident angle 1° in an optical system of the fourth embodiment, when the incident light is corrected by the deflector. It can be seen from the spot diagrams that the diameters of all beam spots are within a 50 μm×50 μm square. In other words, little beam spot deterioration occurs after correction.

TABLE 4

$f=100$
$f_B=6.073$
$NA=0.331$

| Surface No. | R | D | N |
|---|---|---|---|
| 1 | 88.550 | 10.111 | 1.51062 |
| 2 | 1339.000 | 0.266 | — |
| 3 | 74.197 | 12.772 | 1.51062 |
| 4 | −1322.633 | 5.322 | 1.72394 |

TABLE 4-continued $f=100$
$f_B=6.073$
$NA=0.331$

| Surface No. | R | D | N |
|---|---|---|---|
| 5 | 116.645 | 86.844 | — |
| 6 | −52.056 | 6.482 | 1.70583 |
| 7 | 44.249 | 40.444 | — |
| 8 | 17.848 | 4.896 | 1.51062 |
| 9 | 26.999 | 22.103 | — |
| 10 | −11.462 | 2.129 | 1.82462 |
| 11 | −15.118 | 37.571 | — |
| 12 | 15.086 | 3.193 | 1.51062 |
| 13 | ∞ | 0.213 | — |
| 14 | 15.731 | 3.725 | 1.51062 |
| 15 | 17.302 | 0.213 | — |
| 16 | 8.195 | 4.257 | 1.51062 |
| 17 | 17.382 | — | — |

Embodiment 5

Figure 15:
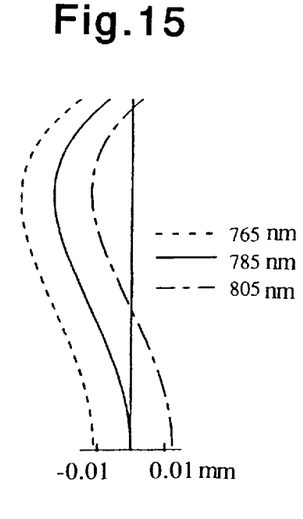
FIG. 15 shows a spherical aberration diagram before a deflector mirror is deflected in a fifth embodiment of an optical axis correcting system according to the present invention.
Figure 16:
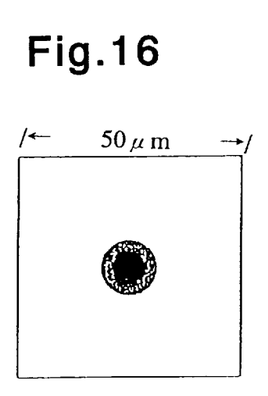
FIG. 16 shows a spot diagram of light incident at an infinite distance (incident angle 0°) before a deflector mirror is deflected in a fifth embodiment of an optical axis correcting system according to the present invention.
Figure 17:
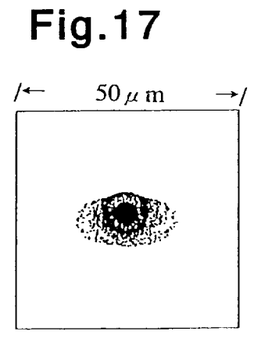
FIG. 17 shows a spot diagram of light incident at an infinite distance and incident angle 1° when the optical axis is corrected by deflecting a deflector mirror in a fifth embodiment of an optical axis correcting system according to the present invention.

Table 5 shows numerical data of a fifth embodiment of the invention. The structure of the optical system is same as that shown in FIG. 2. FIG. 15 is a spherical aberration diagram of the optical system of the fifth embodiment at a wavelength of 765 nm, 785 nm, and 805 nm, before the optical deflector (deflector mirror) is utilized (i.e., before correction). FIG. 16 shows a spot diagram of incident light at an infinite distance (incident angle 0°) in an optical system of the fifth embodiment, before the deflector is utilized. FIG. 17 shows a spot diagram of incident light at an infinite distance and incident angle 1° in an optical system of the fifth embodiment, when the incident light is corrected by the deflector. It can be understood from the spot diagrams that the diameters of all beam spots are within a 50 μm×50 μm square. In other words, little beam spot deterioration occurs after correction.

TABLE 5

$f=100$
$f_B=6.035$
$NA=0.336$

| Surface No. | R | D | N |
|---|---|---|---|
| 1 | 98.605 | 9.890 | 1.51062 |
| 2 | −1546.511 | 0.260 | — |
| 3 | 71.958 | 12.493 | 1.51062 |
| 4 | −1977.585 | 5.205 | 1.72394 |
| 5 | 122.392 | 80.466 | — |
| 6 | −82.613 | 6.340 | 1.70583 |
| 7 | 28.738 | 39.560 | — |
| 8 | 17.398 | 4.789 | 1.51062 |
| 9 | 26.968 | 18.887 | — |
| 10 | −12.169 | 2.082 | 1.82462 |
| 11 | −16.694 | 36.749 | — |
| 12 | 14.756 | 3.123 | 1.51062 |
| 13 | ∞ | 0.208 | — |
| 14 | 15.387 | 3.644 | 1.51062 |
| 15 | 16.923 | 0.208 | — |
| 16 | 8.016 | 4.164 | 1.51062 |
| 17 | 17.001 | — | — |

Embodiment 6

Figure 18:
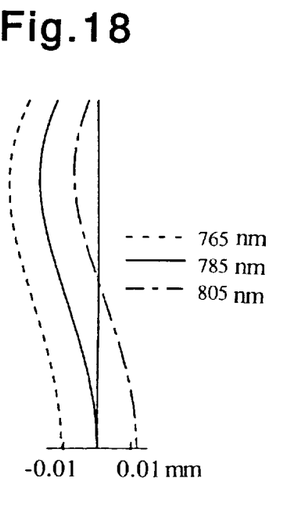
FIG. 18 shows a spherical aberration diagram before a deflector mirror is deflected in a sixth embodiment of an optical axis correcting system according to the present invention.
Figure 19:
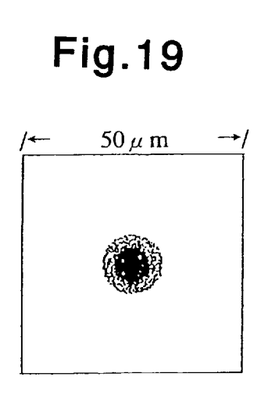
FIG. 19 shows a spot diagram of light incident at an infinite distance (incident angle 0°) before a deflector mirror is deflected in a sixth embodiment of an optical axis correcting system according to the present invention.
Figure 20:
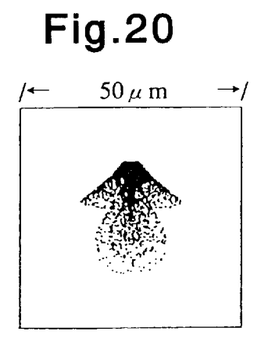
FIG. 20 shows a spot diagram of light incident at an infinite distance and incident angle 1° when the optical axis is corrected by deflecting a deflector mirror in a sixth embodiment of an optical axis correcting system according to the present invention.

Table 6 shows numerical data of a sixth embodiment of the invention. The structure of the optical system is same as that shown in FIG. 2. FIG. 18 is a spherical aberration diagram of the optical system of the sixth embodiment at a wavelength of 765 nm, 785 nm, and 805 nm, before the optical deflector (deflector mirror) is utilized (i.e., before correction). FIG. 19 shows a spot diagram of incident light at an infinite distance (incident angle 0°) in an optical system of the sixth embodiment, before the deflector is utilized. FIG. 20 shows a spot diagram of incident light at an infinite distance and incident angle 1° in an optical system of the sixth embodiment, when the incident light is corrected by the deflector. It can be seen from the spot diagrams that the diameters of all beam spots are within a 50 μm×50 μm square. In other words, little beam spot deterioration occurs after correction.

TABLE 6 f=100
$f_B$=6.376
NA=0.355

| Surface No. | R | D | N |
|---|---|---|---|
| 1 | 110.421 | 10.199 | 1.51062 |
| 2 | −701.509 | 0.268 | — |
| 3 | 74.235 | 12.883 | 1.51062 |
| 4 | −2008.298 | 5.368 | 1.72394 |
| 5 | 126.402 | 83.127 | — |
| 6 | −83.133 | 6.538 | 1.70583 |
| 7 | 29.449 | 40.797 | — |
| 8 | 17.508 | 4.939 | 1.51062 |
| 9 | 27.212 | 20.453 | — |
| 10 | −12.365 | 2.147 | 1.82462 |
| 11 | −17.129 | 37.898 | — |
| 12 | 15.217 | 3.221 | 1.51062 |
| 13 | ∞ | 0.215 | — |
| 14 | 15.868 | 3.758 | 1.51062 |
| 15 | 17.452 | 0.215 | — |
| 16 | 8.267 | 4.294 | 1.51062 |
| 17 | 17.533 | — | — |

Embodiment 7

Figure 21:
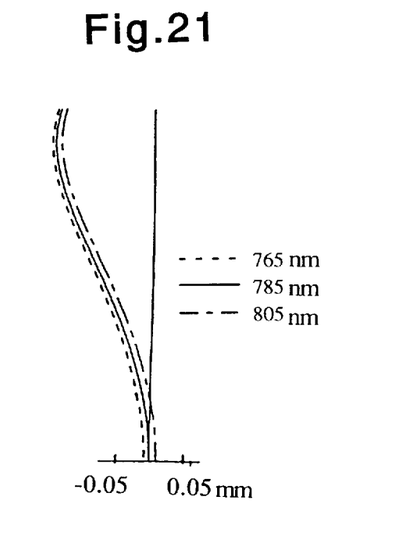
FIG. 21 shows a spherical aberration diagram before a deflector mirror is deflected in a seventh embodiment of an optical axis correcting system according to the present invention.
Figure 22:
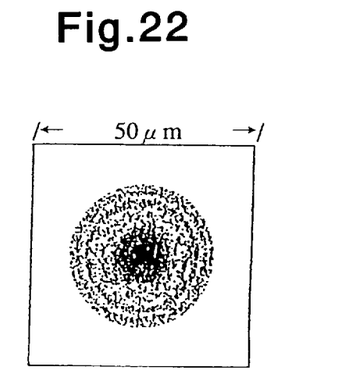
FIG. 22 shows a spot diagram of light incident at an infinite distance (incident angle 0°) before a deflector mirror is deflected in a seventh embodiment of an optical axis correcting system according to the present invention; and, FIG. 23 shows a spot diagram of light incident at an infinite distance and incident angle 1° when the optical axis is corrected by deflecting a deflector mirror in a seventh embodiment of an optical axis correcting system according to the present invention.
Figure 23:
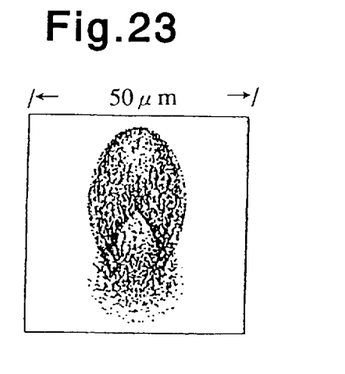

Table 7 shows numerical data of a seventh embodiment of the invention. The structure of the optical system is same as that shown in FIG. 2. FIG. 21 shows spherical aberration diagrams in the optical system of the seventh embodiment before the optical deflector (deflector mirror) is utilized (i.e., before correction). FIG. 22 shows a spot diagram of incident light at an infinite distance (incident angle 0°) in an optical system of the seventh embodiment, before the deflector is utilized. FIG. 23 shows a spot diagram of incident light at an infinite distance and incident angle 1° in an optical system of the seventh embodiment, when the incident light is corrected by the deflector. It can be seen from the spot diagrams that the diameters of all beam spots are within a 50 μm×50 μm square. In other words, little beam spot deterioration occurs after correction.

TABLE 7 f=100
$f_B$=4.828
NA=0.253

| Surface No. | R | D | N |
|---|---|---|---|
| 1 | 71.977 | 8.191 | 1.51062 |
| 2 | 498.068 | 0.216 | — |
| 3 | 57.591 | 10.347 | 1.51062 |
| 4 | −2691.686 | 4.311 | 1.72394 |
| 5 | 94.294 | 72.423 | — |
| 6 | −38.432 | 5.251 | 1.70583 |
| 7 | 34.676 | 32.764 | — |

TABLE 7-continued f=100
$f_B$=4.828
NA=0.253

| Surface No. | R | D | N |
|---|---|---|---|
| 8 | 13.834 | 3.966 | 1.51062 |
| 9 | 34.356 | 17.906 | — |
| 10 | −8.438 | 1.724 | 1.82462 |
| 11 | −14.240 | 30.436 | — |
| 12 | 12.221 | 2.587 | 1.51062 |
| 13 | ∞ | 0.172 | — |
| 14 | 12.743 | 3.018 | 1.51062 |
| 15 | 14.016 | 0.172 | — |
| 16 | 6.639 | 3.449 | 1.51062 |
| 17 | 14.081 | — | — |

Table 8 shows values of each condition in each embodiment. The seven embodiments satisfy the conditions (1) through (3). As can be seen from the spherical aberration diagrams and spot diagrams, a good optical performance can be obtained before and after the correction by the optical deflector is carried out.

TABLE 8

|  | $f_{p(I)}/f_{N(I)}$ | $f_{p(II)}/f_{N(II)}$ | $r_{1(II)}/f$ |
|---|---|---|---|
| Embodiment 1 | 3.999712 | 1.790280 | 0.185281 |
| Embodiment 2 | 3.999712 | 2.193925 | 0.206010 |
| Embodiment 3 | 3.999712 | 1.790280 | 0.199220 |
| Embodiment 4 | 4.482147 | 1.119614 | 0.178477 |
| Embodiment 5 | 4.599845 | 1.194883 | 0.173980 |
| Embodiment 6 | 4.649752 | 1.211920 | 0.175082 |
| Embodiment 7 | 4.844580 | 1.467808 | 0.138342 |

As may be understood from the foregoing, according to the present invention, an optical axis correcting system including an optical deflector in which the convergent optical system can be miniaturized or the deflection angle of the optical axis by the deflector can be increased without sacrificing the convergence performance can be obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical axis correcting system comprising:
   a first optical system having a positive lens group and a single negative lens element, arranged in that order from an object side;
   an optical deflector for correcting a deviation of an optical axis of light incident upon the first optical system;
   a second optical system having at least a positive lens group and a negative lens group, arranged in that order from the object side; and
   a convergent optical system, said first optical system, said optical deflector, said second optical system, and said convergent optical system being arranged in that order from the object side;
   wherein said optical axis correcting system satisfies the following conditions:
   (1) $3.60 < |f_{p(I)}/f_{N(I)}| < 5.30$
   (2) $1.00 < |f_{p(II)}/f_{N(II)}| < 2.41$
   (3) $0.12 < r1\ (II)/f < 0.23$ wherein
fp(I): focal length of the positive lens group of the first optical system;
fN(I): focal length of the single negative lens element of the first optical system;
fp(II): focal length of the positive lens group of the second optical system;
fN(II): focal length of the negative lens group of the second optical system;
r1 (II): radius of curvature of the surface of the positive lens group of the second optical system that is located closest to the optical deflector; and
f: focal length of the whole optical system.

2. An optical axis correcting system according to claim 1, wherein said positive and negative lens groups of the second optical system are each made of a single lens element.

3. An optical axis correcting system according to claim 1, wherein said positive lens group of the first optical system comprises a positive lens element, a positive lens element and a negative lens element, arranged in that order from the object side.

4. An optical axis correcting system comprising:
a first afocal optical system;
an optical deflector for correcting the deviation of an optical axis of light incident upon the first afocal optical system; and
a convergent optical system, arranged in that order from the object side;
wherein said optical axis correcting system further comprises a second afocal optical system provided between the optical deflector and the convergent optical system, said second afocal optical system being composed of at least a positive lens group and a negative lens group, in this order from the object side, and wherein said optical axis correcting system satisfies the following conditions (1) through (3);
(1) $3.60 < |fp(I)/fN(I)| < 5.30$
(2) $1.00 < |fp(II)/fN(II)| < 2.41$
(3) $0.12 < r1\ (II)/f < 0.23$
wherein
fp(I): focal length of the positive lens group of the first afocal optical system;
fN(I): focal length of the single negative lens of the first afocal optical system;
fp(II): focal length of the positive lens group of the second afocal optical system;
fN(II): focal length of the negative lens group of the second afocal optical system;
r1 (II): radius of curvature of the surface of the positive lens group of the second afocal optical system that is located closest to the optical deflector; and
f: focal length of the whole optical system.

5. An optical axis correcting system according to claim 4, wherein said positive and negative lens groups of the second afocal optical system are each made of a single lens element.

6. An optical axis correcting system according to claim 4, wherein said first afocal optical system comprises a positive lens group and a single negative lens element, arranged in that order from the object side.

7. An optical axis correcting system according to claim 6, wherein said positive lens group of the first afocal optical system is made of a positive lens element, a positive lens element and a negative lens element, arranged in that order from the object side.

* * * * *